United States Patent
Ishikawa et al.

(10) Patent No.: US 8,562,473 B2
(45) Date of Patent: Oct. 22, 2013

(54) SPEED REDUCER INCORPORATING PORTION STRUCTURE, INCORPORATING METHOD, AND ECCENTRIC OSCILLATING TYPE SPEED REDUCER

(75) Inventors: Tetsuzo Ishikawa, Obu (JP); Takashi Haga, Obu (JP); Yoshitaka Shizu, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/525,476

(22) Filed: Jun. 18, 2012

(65) Prior Publication Data

US 2013/0023374 A1    Jan. 24, 2013

(30) Foreign Application Priority Data

Jul. 20, 2011   (JP) .................................. 2011-159431

(51) Int. Cl.
*F16H 1/32* (2006.01)
(52) U.S. Cl.
USPC ........................................................... 475/168
(58) Field of Classification Search
USPC ........................................................ 475/168
See application file for complete search history.

(56) References Cited

U.S. PATENT DOCUMENTS

| 4,690,010 | A  | * | 9/1987 | Matsumoto et al. | ............ 74/469 |
| 4,909,102 | A  | * | 3/1990 | Haga | .............................. 475/168 |
| 7,553,249 | B2 | * | 6/2009 | Nohara | ......................... 475/170 |
| 8,353,798 | B2 | * | 1/2013 | Miyoshi et al. | ................ 475/168 |
| 8,435,150 | B2 | * | 5/2013 | Schuler et al. | ................. 475/166 |

FOREIGN PATENT DOCUMENTS

JP    2006-263878 A    10/2006

* cited by examiner

*Primary Examiner* — Dirk Wright
(74) *Attorney, Agent, or Firm* — Squire Sanders (US) LLP

(57) ABSTRACT

There is provided a speed reducer incorporating portion structure for a plurality of industrial machines in which an eccentric oscillating type speed reducer having an internal gear and an external gear that rotates in an oscillating manner while internally meshing with the internal gear is incorporated. The speed reducer may be incorporated in the plurality of industrial machines, respectively, so that the position of a meshing portion when the external gear is assembled to the internal gear has a specific phase relationship common to the plurality of industrial machines with respect to a specific part of an industrial machine in which the speed reducer is incorporated.

13 Claims, 7 Drawing Sheets

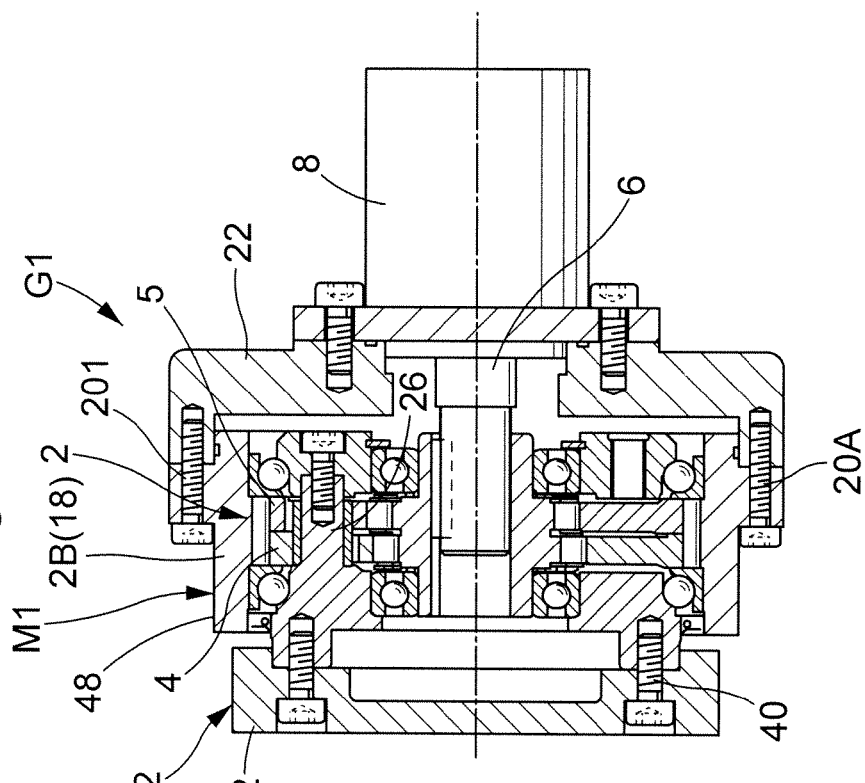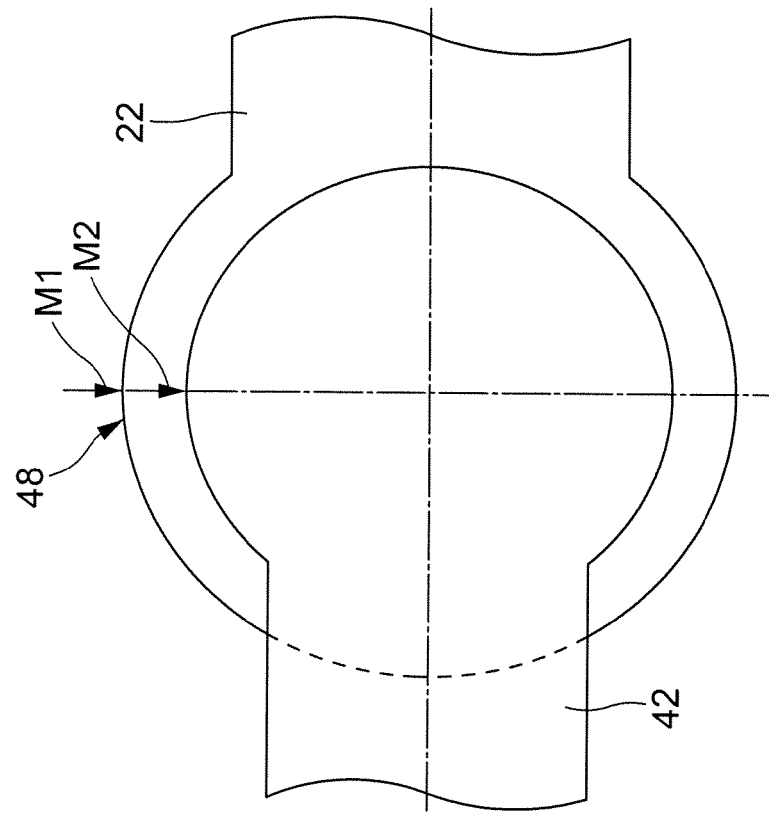

SPEED REDUCER INCORPORATING PORTION STRUCTURE, INCORPORATING METHOD, AND ECCENTRIC OSCILLATING TYPE SPEED REDUCER

CROSS REFERENCE TO RELATED APPLICATIONS

This application claims benefit of Japanese Patent Application No. 2011-159431 filed on Jul. 20, 2011, which is hereby incorporated by reference.

BACKGROUND

1. Field

The present invention relates to a speed reducer incorporating portion structure, an incorporating method, and an eccentric oscillating type speed reducer.

2. Description of the Related Art

For example, an eccentric oscillating type speed reducer is disclosed in the related art.

This eccentric oscillating type speed reducer has an internal gear, and an external gear that rotates in an oscillating manner while internally meshing with the internal gear. The difference in the number of teeth between the internal teeth of the internal gear and the external teeth of the external gear is set to "1". When the external gear oscillates inside the internal gear, the relative rotation between the internal gear and external gear is produced according to the difference in the number of teeth. This type of eccentric oscillating type speed reducer can obtain a high reduction ratio in one stage. Additionally, the backlash of the speed reducer is small compared to a parallel axis type speed reducer or the like. Therefore, this speed reducer is widely adopted for industrial machines which are small and require high positional precision, such as robots or machine tools.

SUMMARY

According to an embodiment of the present invention, there is provided a speed reducer incorporating portion structure for a plurality of industrial machines in which an eccentric oscillating type speed reducer having an internal gear and an external gear that rotates in an oscillating manner while internally meshing with the internal gear is incorporated. The speed reducer are incorporated in the plurality of industrial machines, respectively, so that the position of a meshing portion when the external gear is assembled to the internal gear has a specific phase relationship common to the plurality of industrial machines with respect to a specific part of an industrial machine in which the speed reducer is incorporated.

BRIEF DESCRIPTION OF THE DRAWINGS

FIG. 3A is a cross-sectional view of a speed reducer incorporating portion showing the phase relationship of a meshing portion when the speed reducer is assembled to a specific part of the robot, and FIG. 3B is a side view of FIG. 3A.

DETAILED DESCRIPTION

Figure 1:
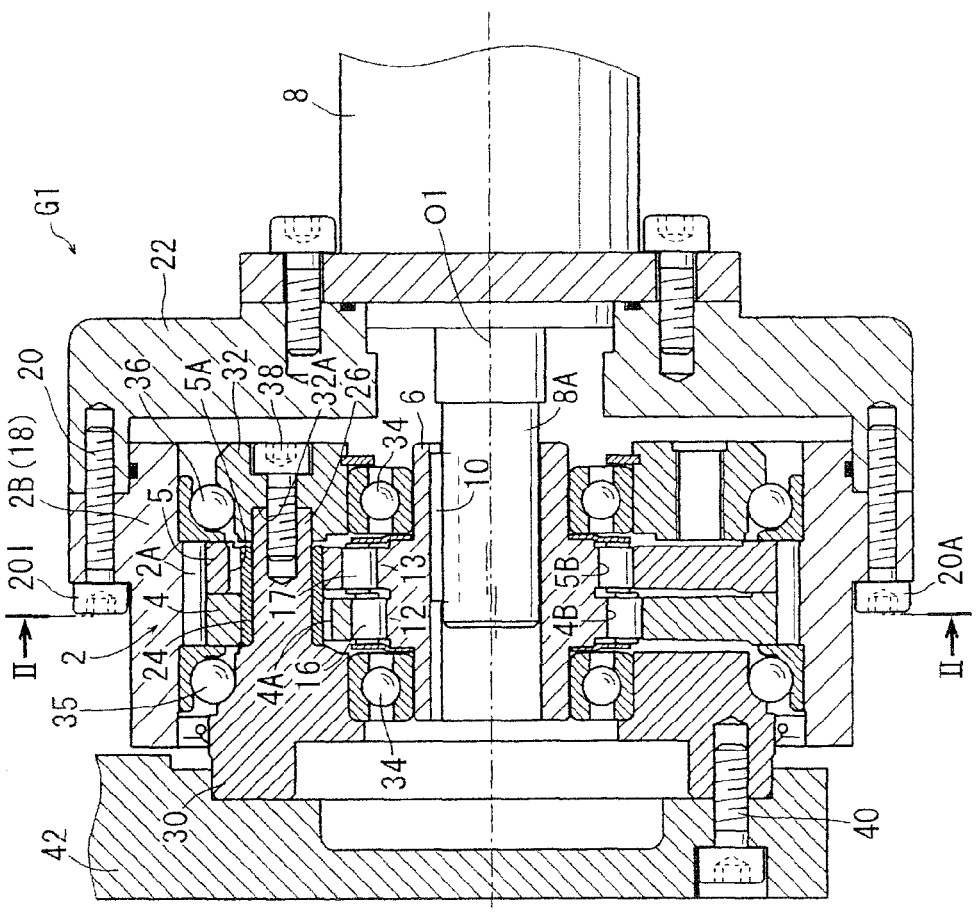
FIG. 1 is a cross-sectional view showing the structure of a speed reducer incorporating portion of a robot related to an embodiment of the invention.

In recent industrial machines, higher positional precision is increasingly required. For this reason, especially when the same members or apparatuses are produced in large quantities by a plurality of industrial machines, since the positional precision differs in respective industrial machines due to individual differences between speed reducers to be incorporated in the respective industrial machines even if the same control program is applied to the respective industrial machines, a problem that adjustment work is needed before the start of operation has been pointed out.

Since this problem produces individual differences among the plurality of industrial machines due to the individual differences between the speed reducers to be incorporated, it is basically required that the manufacturing precision of the speed reducers themselves to be incorporated be enhanced, and the individual differences between the respective speed reducers be made small. However, the manufacturing precision of the eccentric oscillating type speed reducers incorporated in the present industrial machines is already at quite high level. If the manufacturing precision of the speed reducers is further enhanced, a situation is brought about in which the speed reducers are become extremely high-cost.

It is desirable to effectively suppress individual differences generated between respective industrial machines when an eccentric oscillating type speed reducer is incorporated in a plurality of industrial machines at low cost.

As a result of verifying from various perspectives the cause that individual differences are produced among in the eccentric oscillating type speed reducers, the inventors have obtained the knowledge that the influence of deformation generated in the internal gear (usually, the casing integrated with the internal gear) when the external gear is incorporated in the internal gear is great.

However, in the case of the eccentric oscillating type speed reducers, particularly, in the case of the speed reducers to be incorporated in industrial machines that require high positional precision, it is confirmed that it is also extremely difficult to incorporate the external gears without deforming the internal gear.

An embodiment of the invention has been made on the basis of this newly obtained knowledge. In this type of eccentric oscillating type speed reducer, deformation on the internal gear side when the external gears are incorporated in the internal gear is regarded as "being inevitable", and the resulting individual differences between industrial machines in which the eccentric oscillating type speed reducers are incorporated on the assumption of occurrence of this deformation is suppressed.

According to an embodiment of the invention, since the influence of the deformation when the external gears are assembled to the internal gear of the eccentric oscillating type speed reducer in every industrial machine can be made equal, and the individual differences between the respective industrial machines can be suppressed to the minimum, it is possible to prevent variation in products from occurring in every industrial machine. Additionally, the adjustment work tuning before the start of operation of the industrial machines is also reduced.

In addition, the "plurality of industrial machines" in an embodiment of the invention does not necessarily need to be an industrial machine group arranged in the same factory. According to an embodiment of the invention, even in the same type of industrial machine group installed in a geographically distant factory, the individual differences between the industrial machines in which the speed reducer is incorporated can be suppressed. Moreover, even in the same type of industrial machine to be supplied (or replaced) later in time, individual differences with an industrial machine (or before being replaced) which is already being operated can be suppressed.

According to another aspect of an embodiment of the invention, there is provided a speed reducer incorporating method when an eccentric oscillating type speed reducer having an internal gear and an external gear that rotates in an oscillating manner while internally meshing with the internal gear is incorporated in a plurality of industrial machines, respectively. The method includes specifying the position of a meshing portion when the external gear is assembled to the internal gear; and incorporating the speed reducer in the plurality of industrial machines, respectively, so that the position of the meshing portion at the time of the assembling has a specific phase relationship common to the plurality of industrial machines with respect to a specific part of an industrial machine in which the speed reducer is incorporated.

According to still another aspect of an embodiment of the invention, there is provided a speed reducer incorporating method when an eccentric oscillating type speed reducer having an internal gear and an external gear that rotates in an oscillating manner while internally meshing with the internal gear is incorporated in a plurality of industrial machines, respectively. The method includes specifying a minor-axis direction of a pitch circle of the internal gear; assembling the external gear to the internal gear so that a meshing portion with the external gear is located in a direction specified as the minor-axis direction in the pitch circle; and incorporating an eccentric oscillating type speed reducer to which the external gear is assembled in the above step in the plurality of industrial machines, respectively.

Furthermore, according to a still further embodiment of the invention, there is provided an eccentric oscillating type speed reducer having an internal gear and an external gear that rotates in an oscillating manner while internally meshing with the internal gear. The eccentric oscillating type speed reducer includes a mark capable of identifying the position of a meshing portion when the external gear is assembled to the internal gear, at a position where the mark is able to be visually recognized from the outside of the speed reducer.

According to an embodiment of the invention, individual differences generated between respective industrial machines when an eccentric oscillating type speed reducer is incorporated in a plurality of industrial machines can be effectively suppressed at low cost.

An embodiment of the invention will be described below in detail with reference to the drawings.

Figure 2:
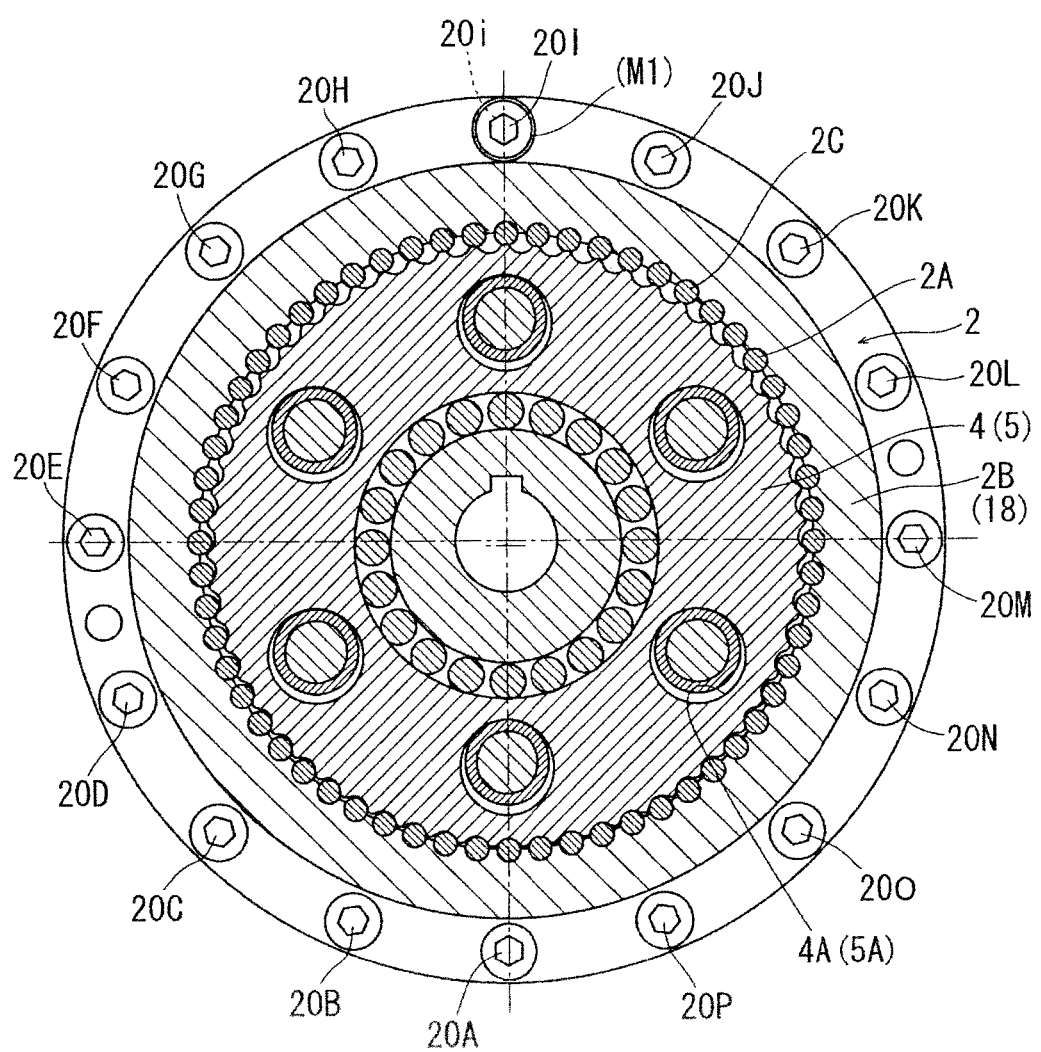
FIG. 2 is a cross-sectional view taken along a line II-II of FIG. 1.

FIG. 1 is a cross-sectional view showing the structure of a speed reducer incorporating portion of a robot (industrial machine) related to an embodiment of the invention, FIG. 2 is a cross-sectional view taken along a line II-II of FIG. 1, FIG. 3A is a cross-sectional view of the speed reducer incorporating portion showing the phase relationship of a meshing portion when a speed reducer G1 is assembled to a specific portion of the robot, and FIG. 3B is a side view of FIG. 3A.

The speed reducer G1 is an eccentric oscillating type speed reducer of a central crank type having an internal gear 2, and external gears 4 and 5 that rotates in an oscillating manner while internally meshing with the internal gear 2.

An input shaft 6 of the speed reducer G1 is coupled with a key 10 of a motor 8 via a motor shaft 8A. The input shaft 6 integrally includes eccentric bodies 12 and 13 for oscillating the external gears 4 and 5. That is, the input shaft 6 functions as a central crank type eccentric body shaft arranged at the position of an axial center O1 of the internal gear 2. The outer peripheries of the eccentric bodies 12 and 13 are eccentric from the axial center (the same as O1) of the input shaft. The eccentric phases of the eccentric bodies 12 and 13 deviate from each other by 180 degrees. The external gears 4 and 5 are incorporated in the outer peripheries of the eccentric bodies 12 and 13 via eccentric body bearings 16 and 17, and internally mesh with the internal gear 2, respectively. Reference numerals 4B and 5B designate bearing holes of the eccentric body bearings 16 and 17. The internal gear 2 is constituted by columnar internal tooth pins 2A that constitute internal teeth, and an internal gear body 2B having pin grooves 2C that support the internal tooth pins 2A. The internal gear body 2B of the internal gear 2 is integrated with a casing 18, and is coupled with a first arm 22 of the robot (not shown) via first to sixteenth bolts 20A to 20P (refer to FIG. 2). The first arm 22 supports the motor 8.

In this embodiment, the number of internal teeth of the internal gear 2 is "60", the number of external teeth of the external gears 4 and 5 is "59", and the number of internal teeth of the internal gear 2 is one more than the number of external teeth of the external gears 4 and has 5. In addition, the difference in the number of teeth may not be limited to 1, and may be two or more. A plurality of inner pin holes 4A and 5A (six in this embodiment) pass through the external gears 4 and 5, and inner pins (pin members) 26 on which a sliding promotion member 24 is put fits into the inner pin holes 4A and 5A with a gap.

First and second carrier bodies 30 and 32 are arranged on both axial sides of the external gears 4 and 5, and support the input shaft 6 via a bearing 34, and are supported by the casing 18 via main bearings 35 and 36. The inner pins 26 are integrated with the first carrier body 30, and are coupled with a recess 32A of the second carrier body 32 via a bolt 38 to couple the first and second carrier bodies 30 and 32 together. The first carrier body 30 is coupled with a second arm 42 of the robot via a bolt 40.

To simply describe the speed reduction action of the speed reducer G1, if the input shaft 6 is rotated by the rotation of the motor 8, the eccentric bodies 12 and 13 rotate integrally and the external gears 4 and 5 oscillate via the eccentric body bearings 16 and 17. Then, the meshing position between the external gears 4 and 5 and the internal gear 2 deviates sequentially, and when the eccentric bodies 12 and 13 rotate once, the external gears 4 and 5 rotates (rotates on its own axis) relative to the internal gear 2 by a gear tooth of "1/59" equivalent to the difference in the number of teeth of "1".

This rotation component is transmitted to the first and second carrier bodies 30 and 32 via the inner pins 26, and is transmitted to the second arm 42 coupled with the first carrier body 30 via the bolt 40. Since the internal gear body 2B is coupled with the first arm 22 via the first to sixteenth bolts 20A to 20P, eventually, the input shaft 6 (eccentric bodies 12 and 13) rotates, and thereby, the second arm 42 is speed-reduced and rotates in a reduction ratio of "1/59" with respect to the first arm 22.

Here, as a result of verifying from various perspectives the cause of individual differences produced among the robots in which the eccentric oscillating type speed reducers G1 (and speed reducers G1a, G1b, and the like of the same type) are incorporated, respectively, the inventor has confirmed that, when the external gears 4 and 5 are incorporated in the internal gear 2, deformation occurs in the internal gear 2 (in this embodiment, actually, the casing 18 with which the internal gear body 2B is integrated), and this deformation exerts a non-negligible influence in the case of the speed reducer G1 that requires extremely high positional precision.

Since defects resulting from a deformation error accompanying such assembling cannot be confirmed depending on the dimensional inspection of a single member, it is a situation in which the cause of the occurrence of individual differences itself has been neglected.

Figure 4:
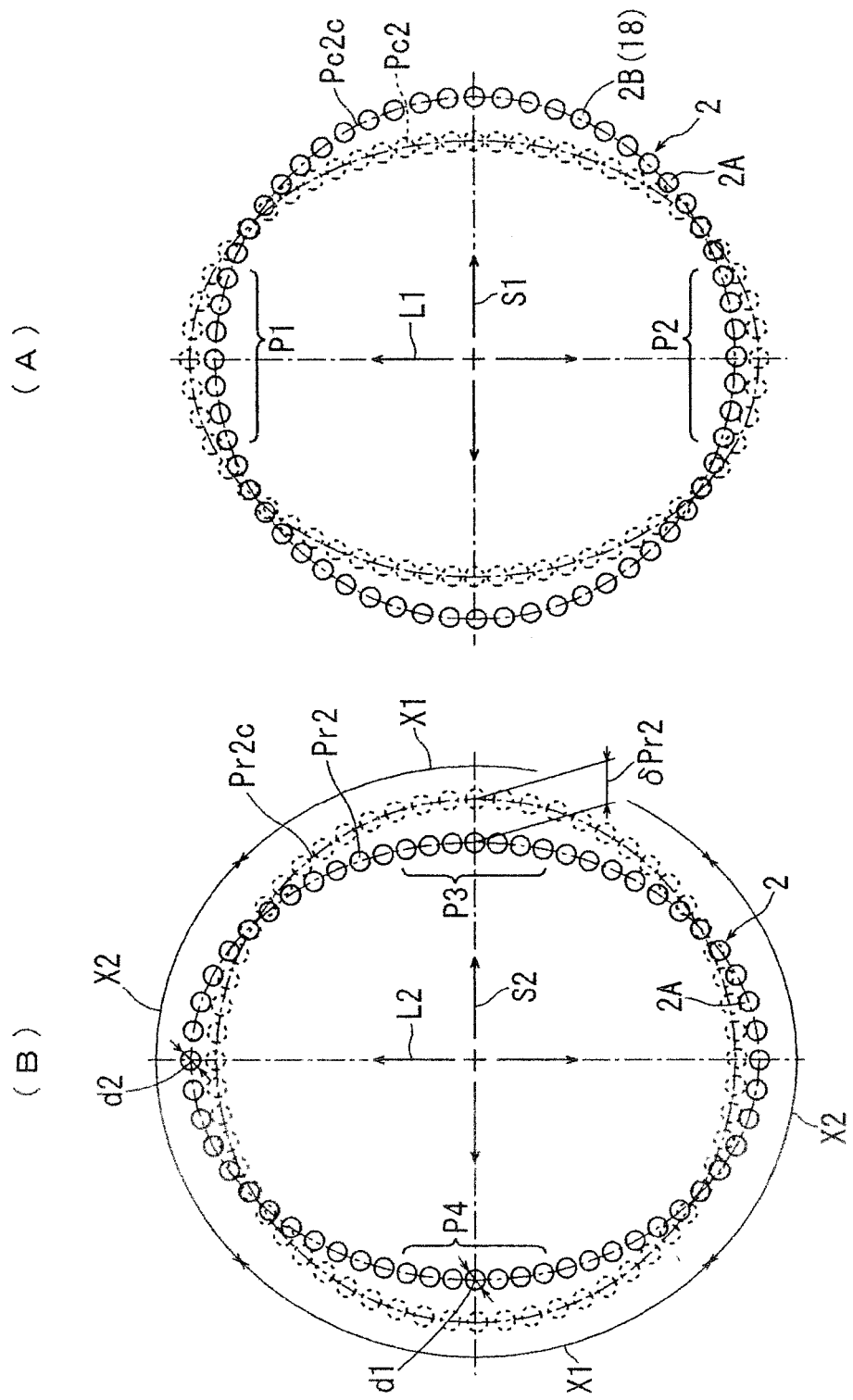
FIGS. 4A and 4B are schematic views for explaining the deformed state of an internal gear.

This will be described with reference to schematic views of FIG. 4A. As shown in FIG. 4A, in an actual machine, the internal gear 2 in the meshing portions P1 and P2 during assembly inevitably deform radially outward. In FIG. 4, the internal gear 2 is drawn by the internal tooth pins 2A. Here, the internal gear may be captured as internal gear body 2B, or may be captured including even the internal tooth pins 2A, and may be captured as the casing 18 in this embodiment. In short, supposing that the state of FIGS. 1 and 2 is a "state during assembly" immediately after the external gears 4 and 5 are assembled, the internal gear 2 may deform substantially in the shape of an ellipse having a direction from a first bolt 20A to a ninth bolt 20I (vertical direction of FIGS. 1 and 2) that is the direction of the meshing portions P1 and P2 as a major axis direction L1 and having a direction from a fifth bolt 20E to a thirteenth bolt 20M as a minor axis direction S1 (refer to imaginary lines).

On the other hand, since the external gears 4 and 5 can be assembled to the internal gear 2 (casing 18) in arbitrary phases, respectively, the meshing portions P1 and P2 when the external gears 4 and 5 are assembled to the internal gear 2 differ in the individual speed reducers G1 (G1a, G1b, and the like). For this reason, if the speed reducers G1 (G1a, G1b, and the like) are incorporated in the first and second arms 22 and 42 without any consideration, for example, a phenomenon that the major axis direction L1 of the internal gear 2 (casing 18) is located in the vertical direction occurs in a robot in which a certain speed reducer G1a is incorporated, and for example, a phenomenon that the major axis direction L1 of the internal gear 2 is located in a direction in which the phase has deviated by 60 degrees from the above location occurs in another robot in which another speed reducer G1b is incorporated.

If an actual pitch circle Pc2 of the internal gear 2 is turned into an elliptical shape apart from a pitch circle Pc2c that is a true circle, when the external gears 4 and 5 have oscillated and rotated during operation, the loss torque and rotation resistance are small in the major axis direction L1 (in a direction in which the actual pitch circle Pc2 is large) of the internal gear 2. Accordingly, the flowing current is also small, but backlash is easily produced. This is reversed in the minor axis direction S1 (in a direction in which the actual pitch circle Pc2 is small). For this reason, for example, when there is a control program in which the second arm 42 reciprocates in a specific "minute range", the motions of the individual robots become different depending on whether the minute range happens to fall in the major axis direction L1 or minor axis direction S1 of the internal gear 2 of the speed reducers G1a, G1b, and the like.

Thus, in the present embodiment, for example as shown in FIG. 3, a mark M1 that can identify the position (especially, position in the circumferential direction) of the meshing portions P1 and P2 when the external gears 4 and 5 are assembled to the internal gear 2 is given to an outer peripheral portion (position that can be visually recognized from the outside) 48 (of the casing 18) of the speed reducer G1. In this embodiment, the mark M1 indicating the position of the meshing portion P2 when the external gear 5 is assembled to the internal gear 2 is given to the outer peripheral portion 48 of the internal gear 2 with paint.

In addition, the external gear to which attention is paid may be any of a plurality of external gears in this way. This is because, as for the position of the meshing portion (P1) when another external gear (external gear 4 in this example) is assembled, the other external gear necessarily has a specific phase relationship with the meshing portion of an external gear to which attention is always paid in terms of the mechanism, and accordingly, the deformation phase of the overall internal gear of the speed reducer is specified if the meshing portion when one external gear is assembled can be specified. Accordingly, it is not particularly necessary to perform marking. The situation is the same even when the number of external gears has increased to three or four because the number of meshing portions (deformation portion) increases simply.

In short, this mark M1 is satisfactory if a person who performs a task of incorporating the speed reducers G1a and G1b in robots can discriminate the position of the meshing portion P1 (P2) when the external gear 4 (5) is assembled in a certain form, and the specific discrimination technique of the mark is not particularly limited.

For example, as described above, in practice, marking, such as a mark ▼, may be performed on the casing 18 at the position corresponding to the meshing portion P1 or P2. For example, only a bolthole 20i of a ninth bolt 20I that is present at a corresponding position may be painted in red. Since a method utilizing a bolt or a bolthole as an identification mark is easily grasped and does not require any extra cost, this is favorable. Additionally, a technique of driving a "striking point" to the corresponding position of the casing 18 with a center punch may be used.

A person who performs a task of incorporating the speed reducer G1 in a robot performs the incorporating so the mark M1 indicating the meshing portion P1 or P2 during this assembling has a common specific phase relationship with respect to specific parts of all the robots in which the speed reducers G1a, G1b, and the like to which the mark M1 is given. In this embodiment, therefore, the corresponding relationship can be more clearly recognized visually such that a corresponding mark M2 is given to a specific position to have a specific phase relationship even in the second arm 42. However, since the mark M2 indicating a specific part on the side of the second arm 42 (that is, the robot side) becomes a certain mark arbitrarily determined by a worker, and can be easily substituted, it is not necessarily required to perform marking on the robot itself in advance.

According to this embodiment, all of the plurality of industrial robots in which the eccentric oscillating type speed reducer G1a, G1b, and the like are incorporated, respectively, are incorporated so that the positions of the meshing portions P1 and P2 when the external gears 4 and 5 are incorporated have the same phase, for example, even if slight deformation has occurred in the internal gear 2 (casing 18) at the time of the incorporating, the phase of the deformation is the same in all the robots. For this reason, all the robots perform closer to exactly the same operation according to the same control program, and performing production with small individual differences becomes possible.

Next, another embodiment of the invention will be described.

Referring to the schematic view of FIG. 4B, description will be made the same types of members being designated by the same reference numerals as those of the previous embodiment for convenience. In this embodiment, in a stage (stage before the external gears 4 and 5 are assembled) in which the internal gear 2 is manufactured, a manufacturing error ΔPr2 is actually examined from the pitch circle Pr2c of the true circle of an original pitch circle Pr2 of the internal gear 2. Specifically, the internal diameter of the internal gear 2 is measured at a plurality of locations, and the major axis direction L2 and the minor axis direction S2 are specified. Although the original pitch circle Pr2 of the internal gear 2 is an original pitch circle of the pin grooves 2C of the internal gear body 2B and is ideally a true circle, actually, the original pitch circle does not become a true circle but becomes an ellipse due to a manufacturing error. As a result, the original pitch circle of the internal tooth pins 2A incorporated in the pin grooves 2C also becomes an ellipse. Now, it become clear that, for example, the original pitch circle Pr2 of the internal gear 2 to originally become the pitch circle Pr2c of a true circle as shown by an imaginary line of FIG. 4B is formed in the shape of an ellipse in which the major axis direction L2 and the minor axis direction S2 as shown by solid lines are present.

In such a case, in this embodiment, the external gears 4 and 5 are assembled so that the meshing portions P3 and P4 of the internal gear (during assembly) 2 and the external gears 4 and 5 are located in the minor axis direction S2. As a result, actually, the original pitch circle Pr2 in the minor axis direction S2 to be originally manufactured slightly larger is deformed in a direction (direction approaching the pitch circle Pr2c that is a true circle) in which the original pitch circle in the minor axis direction becomes larger than the original pitch circle Pr2 by assembling the external gears 4 and 5, so that the assembling can be performed so as to eliminate the manufacturing error ΔPr2.

That is, according to this embodiment, the phenomenon that the internal gear 2 deforms when the external gears 4 and 5 are assembled can be regarded as an embodiment positively utilized in order to "suppress individual differences (dimensional differences) themselves when speed reducers are completed one by one". Since the deformation inevitably generated during assembly are reversely utilized to reduce the individual differences between the speed reducers G1a, G1b, and the like themselves, the individual differences between the respective robots can be reduced by incorporating the speed reducers (individual differences are small) G1a, G1b, and the like that are manufactured in this way.

In addition, in this embodiment, it is favorable if the mark indicating the minor axis direction S2 produced due to a manufacturing error from the true circle of the original pitch circle Pr2 of the internal gear 2 is displayed on this internal gear 2 (or casing 18 integrated with the internal gear 2), this mark becomes an index of incorporating of the external gear 4 and 5 or the like.

Additionally, when the original pitch circle Pr2 of the internal gear 2 is inspected in this way in a stage in which the internal gear 2 is manufactured, a plurality of types of internal tooth pins 2A with different external diameters differ may be incorporated as the internal teeth pins 2A that constitute the internal gear 2 (of the single eccentric oscillating type speed reducer G1). That is, for example, when the manufacturing error ΔPr2 from pitch circle Pr2c of the true circle of the original pitch circle Pr2 of the internal gear 2 is large enough that the manufacturing error is not eliminated even due to the deformation caused by the assembling of the external gear 4, internal tooth pins with a small external diameter d1 is incorporated as the internal teeth pins 2A (internal tooth pins 2A of a region X1 of FIG. 4B) on the side of the minor axis direction S2, and internal tooth pins with a larger external diameter d2 than the external diameter d1 is incorporated as the internal teeth pins 2A (inner pins of a region X2 of FIG. 4B) on the side of the major axis direction L2 (d1<d2). Thereby, the actual pitch circle of the substantial internal gear 2 can be brought nearer to a true circle.

In addition, on the contrary, for example, if the manufacturing error ΔPr2 of the internal gear 2 is not so large (is originally close to the pitch circle Pr2c of the true circle) and the external gears 4 and 5 are assembled so as to coincide with the minor axis direction S2 side, when the minor-axis direction until then is rather reversed in the minor axis direction due to the deformation caused by this assembling, internal tooth pins in which the difference of the external diameter is made smaller may be incorporated after the size relationship between the external diameter of the internal tooth pins 2A incorporated in the region X1 and the external diameter of the internal tooth pins 2A incorporated in the region X2 is reversed.

After the individual differences between the speed reducers are further eliminated in this way, similarly to the previous embodiment, if the speed reducer G1 is incorporated in a plurality of robots, respectively, so that the meshing portions P3 and P4 when the external gears 4 and 5 are assembled have a specific phase relationship common to the plurality of robots, with specific parts of the robots in which the speed reducer G1a, G1b, and the like are incorporated. Then, a robot group that does not have individual differences can be further obtained.

Figure 5:
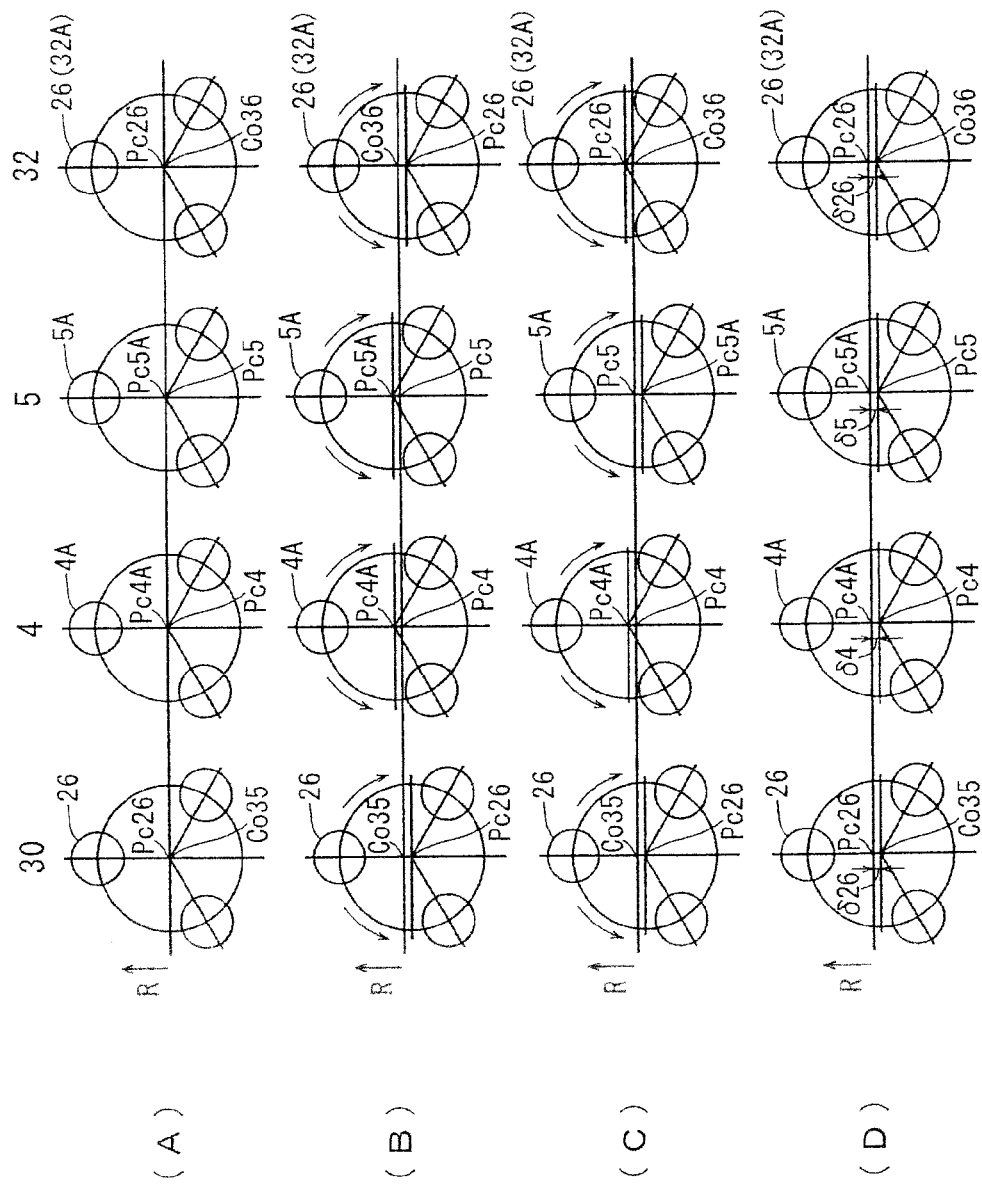
FIGS. 5A to 5D are schematic views for explaining the relationship of machine errors of a first carrier body, two external gears, and a second carrier body.

In addition, in order to further improve the method of assembling the external gear of the speed reducer G1 in the viewpoint of eliminating the "individual differences" of the speed reducer G1, the phase focusing as shown in FIG. 5 may be adopted.

FIGS. 5A to 5D are schematic views showing a relationship between errors (eccentric directions) Δ4 and Δ5 of pitch circle centers Pc4A and Pc5A of the inner pin holes 4A and 5A of the inner pins 26 of the external gears 4 and 5 with respect to pitch circle centers Pc4 and Pc5 of the external teeth of the external gears 4 and 5, and an error (eccentric direction) Δ26 of a pitch circle center Pc26 of the inner pins 26 supported by the first and second carrier bodies 30 and 32 with respect to rotation centers Co35 and Co36 of the main bearings 35 and 36 of the first and second carrier bodies 30 and 32.

FIG. 5A shows an original incorporating aspect without error. Therefore, the respective pitch circle centers Pc4A, Pc5A, Pc4, Pc5, Pc26 and the rotation center Co35 and Co36 of the main bearings 35 and 36 completely coincide with each other, and the external gears 4 and 5 can oscillate extremely smoothly around the inner pins 26, and can transmit a rotation component to the inner pins 26 without loss.

In contrast, as illustrated in FIGS. 5B or 5C, actually manufactured respective members necessarily have errors. Moreover, the directions of the errors are also different. In addition, actually, although the manufacturing error does not occur only in one axial direction (the direction R) simply in this way, the models are significantly simplified in order to describe a qualitative tendency plainly.

When assembling is simply made without taking into consideration the direction in which an error is generated at all as shown in FIGS. 5B and 5C irrespective of the presence of a manufacturing error, the errors accumulate (multiplying) depending on the part. Therefore, the smoothness of the oscillating rotation of the external gears 4 and 5 is greatly impaired.

Thus, in the present embodiment, the first and second carrier bodies 30 and 32 and the external gears 4 and 5 are rotated rightward or leftward of FIG. 5 by 120 degrees, respectively, also in consideration of eccentricity other than the direction R, and the errors (eccentric directions) Δ4 and Δ5 of the pitch circle centers Pc4A and Pc5A of the inner pin holes 4A and 5A of the inner pins 26 of the external gears 4 and 5 with respect to the pitch circle centers Pc4 and Pc5 of the external teeth of the external gears 4 and 5 is made to coincide with the error (eccentric direction) Δ26 of the pitch circle center Pc26 of the inner pins 26 supported by the first and second carrier bodies 30 and 32 with respect to the rotation centers Co35 and Co36 of the main bearings 35 and 36 of the first and second carrier bodies 30 and 32. Of course, although it may be difficult to completely make the errors coincide with each other, in many cases, the errors can at least be kept from accumulating (multiplying).

In addition, in this case, the deviations (eccentric directions) Δ4 and Δ5 between the pitch circle center Pc4A and Pc5A of the inner pin holes 4A and 5A of the inner pins 26 of the external gears 4 and 5 and the pitch circle centers Pc4 and Pc5 of the external teeth of the external gears 4 and 5, and the deviation (eccentric direction) Δ26 of the pitch circle center Pc26 of the inner pins 26 supported by the first and second carrier bodies 30 and 32 and the rotation centers Co35 and Co36 of the main bearings 35 and 36 of the first and second carrier bodies 30 and 32 may not necessarily become zero. This is because the external gears 4 and 5 can maintain substantially the same rotation smoothness as FIG. 5A substantially when these deviations Δ4, Δ5, and Δ26 are present by the same distance in the same direction from an original design position as shown in FIG. 5D.

As such, the individual differences (resulting from the speed reducers G1a, G1b, and the like of) of the respective robots can be nearly completely eliminated if (a) phases are arranged in consideration of the mutual eccentric errors of the external gears 4 and 5 and the first and second carrier bodies 30 and 32; b) the external gears 4 and 5 are incorporated so that the meshing portions with the external gears 4 and 5 are present in the minor-axis direction of the internal gear 2; c) a plurality of types of internal tooth pins with different external diameters are incorporated as the internal teeth pin 2A that constitute the internal gear 2, in consideration of a final error about which the deformation of the internal gear generated at the time of incorporating is additionally considered; and d) the speed reducers G1a, G1b, and the like are incorporated in a plurality of robots, respectively so that the meshing portions P3 and P4 when the external gears 4 and 5 are assembled have a specific phase relationship common to the plurality of robots with respect to specific parts of the respective robots.

However, in the invention, it is not necessary to perform all of the above a) to d), and some maybe appropriately omitted from a viewpoint of cost or assembling labor.

In addition, in the above embodiment, the case where the second arm 42 with which the first and second carrier bodies 30 and 32 are coupled is a fixed member and the first arm 22 with which the internal gear 2 (casing 18) is coupled is a rotating member has been described for convenience. However, the fixing and the rotation are relative, and the fixation and the rotation can be reversed. When the second arm 42 is regarded as being fixed and the first arm 22 is regarded as being rotated, the inner pins (pin members) 26 function as members that restrain the rotation of the external gears 4 and 5, and the internal gear 2 (casing 18) functions as a rotating member.

Figure 6:
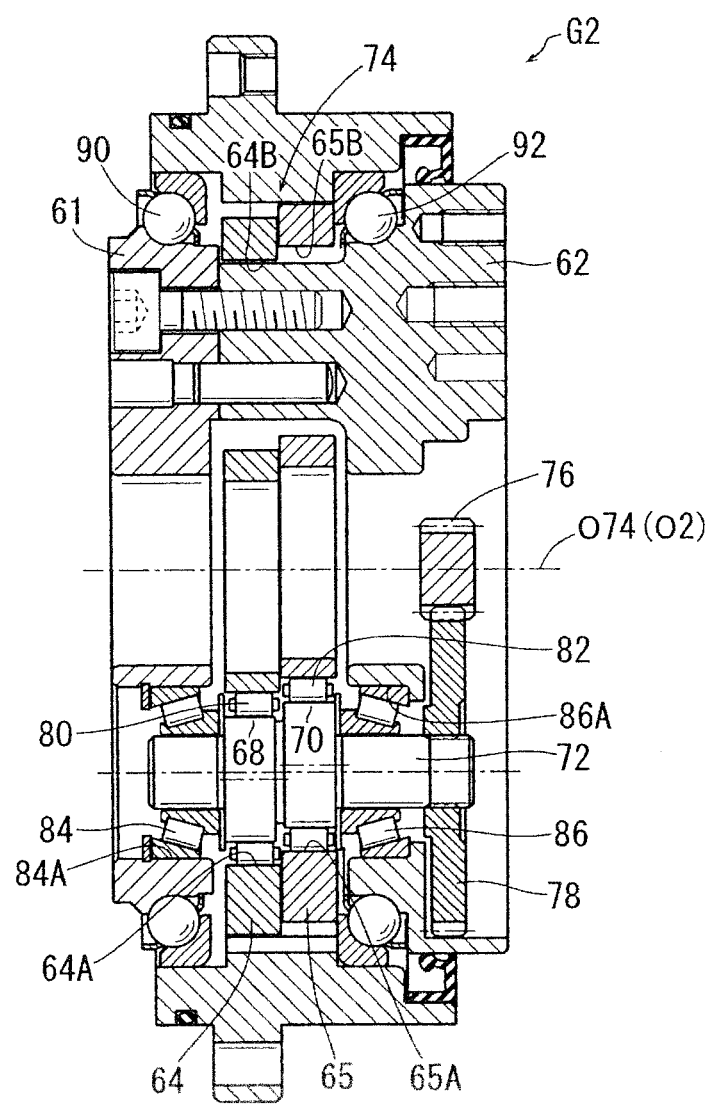
FIG. 6 is cross-sectional view showing an eccentric oscillating type speed reducer related to another embodiment of the invention.
Figure 7:
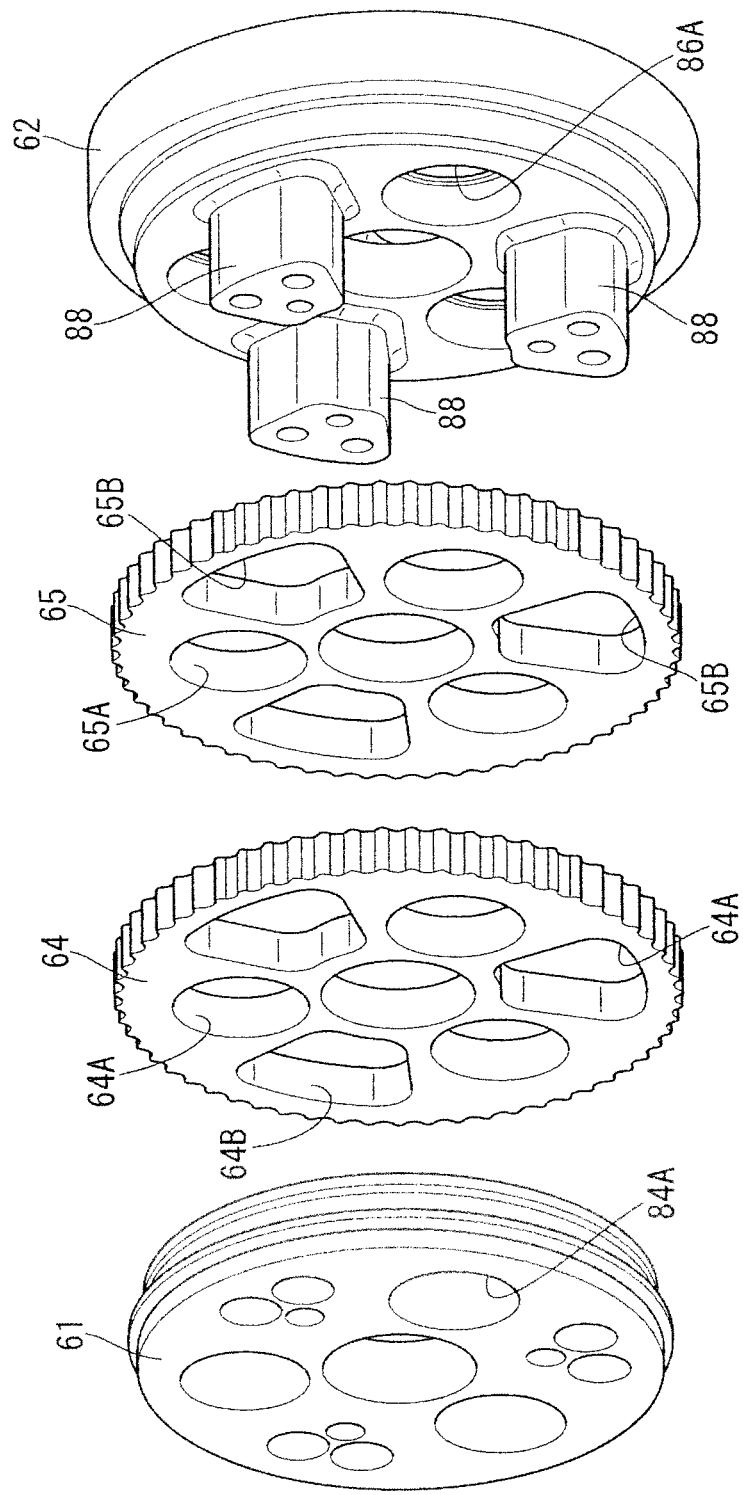
FIG. 7 is an exploded perspective view of a first carrier body two external gears, and a second carrier body of the speed reducer of FIG. 6.

In addition, as the eccentric oscillating type speed reducer G1, for example, the speed reducer G2 of the structure referred to as a distribution type as shown in FIG. 6 and FIG. 7 is also known in addition to the "central crank type speed reducer G1 as described above, and the invention can also be similarly applied to this.

As is clear from FIGS. 6 and 7, this type of eccentric oscillating type speed reducer G2 includes an internal gear 74, external gears 64 and 65 that internally mesh with the internal gear 74, a plurality of (three in this example) eccentric body shafts 72 (only one is shown) having eccentric bodies 68 and 70 for oscillating the external gears 64 and 65, and first and second carrier bodies 61 and 62 that support the plurality of eccentric body shaft 72s at a position offset from an axial center position O74 of the internal gear 74.

The power of a motor that is not shown is input from a pinion 76. The pinion 76 meshes with a plurality of (three in this example) distribution gears 78 (only one is shown). The distribution gears 78 are fixed to the three eccentric body shafts 72, respectively. The eccentric bodies 68 and 70 are integrally formed in each eccentric body shaft 72. The eccentric body 68 has an eccentric phase aligned and is able to oscillate the external gear 64 via an eccentric body bearing 80. The eccentric body 70 has an eccentric phase aligned in a state where the eccentric body deviates from the eccentric body 68 by 180 degrees, and is able to oscillate the external gear 65 via an eccentric body bearing 82. Each eccentric body shaft 72 is rotatably supported by the first and second carrier bodies 61 and 62 via bearings 84 and 86.

If the rotation of the motor is sequentially transmitted to the pinion 76, the distribution gears 78, the eccentric body shaft 72, and the eccentric bodies 68 and 70, and the external gears 64 and 65 rotate, the eccentric body shaft 72 revolves around an axial center O2 of the speed reducer G2 in synchronization with the rotation components of the external gears 64 and 65, and this revolution rotates the first and second carrier bodies 61 and 62. That is, in this distribution type of eccentric oscillating type speed reducer G2, the eccentric body shaft 72 serves also as the function of a central crank type eccentric body shaft and inner pins (pin members).

Even in such a distribution type eccentric oscillating type speed reducer G2, similarly to the previous embodiment, when the external gears 64 and 65 are assembled to the internal gear 74, deformation occur in the internal gear 74, and this deformation will produce individual differences in the respective robots to which the speed reducer G2 is incorporated. Therefore, the positions of the meshing portions (not shown) at the time of the assembling of the external gears 64 and 65 can be identified, and individual differences between the respective robots can be suppressed by performing incorporating so that the positions maintain a specific phase common to specific parts of the robots.

The eccentric oscillating type speed reducer G2 related to this structure is simply different from the previous embodiment in terms of the mechanism for oscillating the external gears 64 and 65. As for the structure and working effects related to the invention, the same configuration can be used, and the same working effects can be obtained.

In addition, when the phase focusing configuration of the above c) is realized in this distribution type of speed reducer G2, the eccentric body shaft 72 also serves as the function of the inner pins (pin members) 26 of the previous embodiment. Thus, the external gears 64 and 65 maybe assembled to the internal gear 74 so that the eccentric direction of a pitch circle center of bearing holes 64A and 65A of the bearings 84 and 86 of the eccentric body shaft 72 of the external gears 64 and 65 with respect to the pitch circuit center of the external teeth of the external gears 64 and 65 coincides with the eccentric direction of a pitch circle center of bearing holes 84A and 86A of the eccentric body shaft 72 of the first and second carrier bodies 61 and 62 with respect to the rotation center of the main bearings 90 and 92 of the first and second carrier bodies 61 and 62. In addition, since carrier pins 88 are not in contact with the carrier pin holes 64B and 65B of the external gears 64 and 65 only by coupling the first and second carrier bodies 61 and 62 together, it is not necessary to take into consideration the relationship between the carrier pins 88 and the carrier pin holes 64B and 65B from a viewpoint of phase focusing.

It should be understood that the invention is not limited to the above-described embodiment, but may be modified into various forms on the basis of the spirit of the invention. Additionally, the modifications are included in the scope of the invention.

What is claimed is:

1. A speed reducer incorporating portion structure for a plurality of industrial machines in which an eccentric oscillating type speed reducer having an internal gear and an external gear that rotates in an oscillating manner while internally meshing with the internal gear is incorporated,
   wherein the speed reducer is incorporated in the plurality of industrial machines, respectively, so that the position of a meshing portion when the external gear is assembled to the internal gear has a specific phase relationship common to the plurality of industrial machines with respect to a specific part of an industrial machine in which the speed reducer is incorporated.

2. The speed reducer incorporating portion structure according to claim 1,
   wherein the eccentric oscillating type speed reducer includes a mark capable of identifying the position of the meshing portion when the external gear is assembled to the internal gear, at a position where the mark is able to be visually recognized from the outside of the speed reducer.

3. The speed reducer incorporating portion structure according claim 1,
   wherein the internal gear is constituted by columnar internal tooth pins that constitutes internal teeth, and internal gear body having pin grooves that support the internal tooth pins, and
   wherein a mark indicating a minor-axis direction of a pitch circle of the internal gear before the external gear is assembled is displayed on the internal gear or a member integrated with the internal gear.

4. The speed reducer incorporating portion structure according to claim 1,
   wherein the internal gear is constituted by columnar internal tooth pins that constitutes internal teeth, and internal gear body having pin grooves that support the internal tooth pins, and
   wherein a plurality of types of internal tooth pins with different external diameters are incorporated as internal teeth pins that constitute the internal gear of a single eccentric oscillating type speed reducer.

5. A speed reducer incorporating method when an eccentric oscillating type speed reducer having an internal gear and an external gear that rotates in an oscillating manner while internally meshing with the internal gear is incorporated in a plurality of industrial machines, respectively,
   the method comprising
   specifying the position of a meshing portion when the external gear is assembled to the internal gear; and
   incorporating the speed reducer in the plurality of industrial machines, respectively, so that the position of the meshing portion at the time of the assembling has a specific phase relationship common to the plurality of industrial machines with respect to a specific part of an industrial machine in which the speed reducer is incorporated.

6. A speed reducer incorporating method when an eccentric oscillating type speed reducer having an internal gear and an external gear that rotates in an oscillating manner while internally meshing with the internal gear is incorporated in a plurality of industrial machines, respectively,
   the method comprising:
   specifying a minor-axis direction of a pitch circle of the internal gear;
   assembling the external gear to the internal gear so that a meshing portion with the external gear is located in a direction specified as the minor-axis direction in the pitch circle; and
   incorporating an eccentric oscillating type speed reducer to which the external gear is assembled in the above step in the plurality of industrial machines, respectively.

7. The speed reducer incorporating method according to claim 6,
   wherein the speed reducer is incorporated in the plurality of industrial machines, respectively, so that the position of the meshing portion at the time of the assembling has a specific phase relationship common to the plurality of industrial machines with respect to a specific part of an industrial machine in which the speed reducer is incorporated, when the eccentric oscillating type speed reducer to which the external gear is assembled is incorporated in the industrial machines so that the meshing portion is located according to the minor-axis direction.

8. An eccentric oscillating type speed reducer having an internal gear and an external gear that rotates in an oscillating manner while internally meshing with the internal gear is incorporated,
   wherein the eccentric oscillating type speed reducer includes a mark capable of identifying the position of a meshing portion when the external gear is assembled to the internal gear, at a position where the mark is able to be visually recognized from the outside of the speed reducer.

9. The eccentric oscillating type speed reducer according to claim 8,
   wherein the internal gear is constituted by columnar internal tooth pins that constitutes internal teeth, and an internal gear body having pin grooves that support the internal tooth pins, and
   wherein a mark indicating a minor-axis direction of a pitch circle of the internal gear before the external gear is assembled is displayed on the internal gear or a member integrated with the internal gear.

10. The eccentric oscillating type speed reducer according to 8,
    wherein the internal gear is constituted by columnar internal tooth pins that constitutes internal teeth, and internal gear body having pin grooves that support the internal tooth pins, and wherein a plurality of types of internal tooth pins with different external diameters are incorporated as internal teeth pins that constitute the internal gear of a single eccentric oscillating type speed reducer.

11. The eccentric oscillating type speed reducer claim 10,
    wherein before the external gear is assembled, smaller-diameter internal tooth pins are incorporated on the minor-axis side of the pitch circle of the internal gear, and larger-diameter internal tooth pins are incorporated on the major-axis side of the pitch circle of the internal gear.

12. The eccentric oscillating type speed reducer according to claim 8,
wherein the eccentric oscillating type speed reducer is an eccentric oscillating type speed reducer of a central crank type including an eccentric body shaft having an eccentric body for oscillating the external gear and being arranged at an axial center position of the internal gear, and a carrier supporting a plurality of pin members for restraining the rotation of the external gear or for extracting the rotation at positions offset from the axial center position of the internal gear, and
wherein the external gear is assembled to the internal gear so that the eccentric direction of a pitch circle center of pin holes, which are provided in the external gear and have the pin members passing therethrough, with respect to a pitch circle center of external teeth of the external gear coincides with the eccentric direction of a pitch circle center of the pin members, which are supported by the carrier, with respect to the rotation center of a main bearing of the carrier.

13. The eccentric oscillating type speed reducer according to claim 8,
wherein the eccentric oscillating type speed reducer is an eccentric oscillating type speed reducer of a distribution type including a plurality of eccentric body shafts having eccentric bodies for oscillating the external gear, and a carrier supporting the plurality of eccentric body shafts at positions offset from the axial center position of the internal gear, and
wherein the external gear is assembled to the internal gear so that the eccentric direction of a pitch circle center of bearing holes of the eccentric body shafts of the external gear with respect to a pitch circle center of external teeth of the external gear coincides with the eccentric direction of a pitch circle center of the bearing holes of the eccentric body shafts of the carrier with respect to the rotation center of a main bearing of the carrier.

* * * * *